Dec. 19, 1961 R. E. LE BLOND ET AL 3,013,457
CRANKSHAFT LATHE AND METHOD OF OPERATION
Filed Feb. 4, 1959 10 Sheets-Sheet 1

INVENTORS
RICHARD E. LEBLOND
GEORGE E. RUEHRWEIN
BY
Toulmin & Toulmin
ATTORNEYS

INVENTORS
RICHARD E. LEBLOND
GEORGE E. RUEHRWEIN
BY
Toulmin & Toulmin
ATTORNEYS

Dec. 19, 1961 R. E. LE BLOND ET AL 3,013,457
CRANKSHAFT LATHE AND METHOD OF OPERATION
Filed Feb. 4, 1959 10 Sheets-Sheet 4

INVENTORS
RICHARD E. LEBLOND
GEORGE E. RUEHRWEIN
BY

*Toulmin & Toulmin*

ATTORNEYS

INVENTORS
RICHARD E. LEBLOND
GEORGE E. RUEHRWEIN
BY

*Toulmin & Toulmin*

ATTORNEYS

Dec. 19, 1961     R. E. LE BLOND ET AL     3,013,457
CRANKSHAFT LATHE AND METHOD OF OPERATION
Filed Feb. 4, 1959     10 Sheets-Sheet 6

INVENTORS
RICHARD E. LEBLOND
GEORGE E. RUEHRWEIN
BY
*Toulmin & Toulmin*
ATTORNEYS

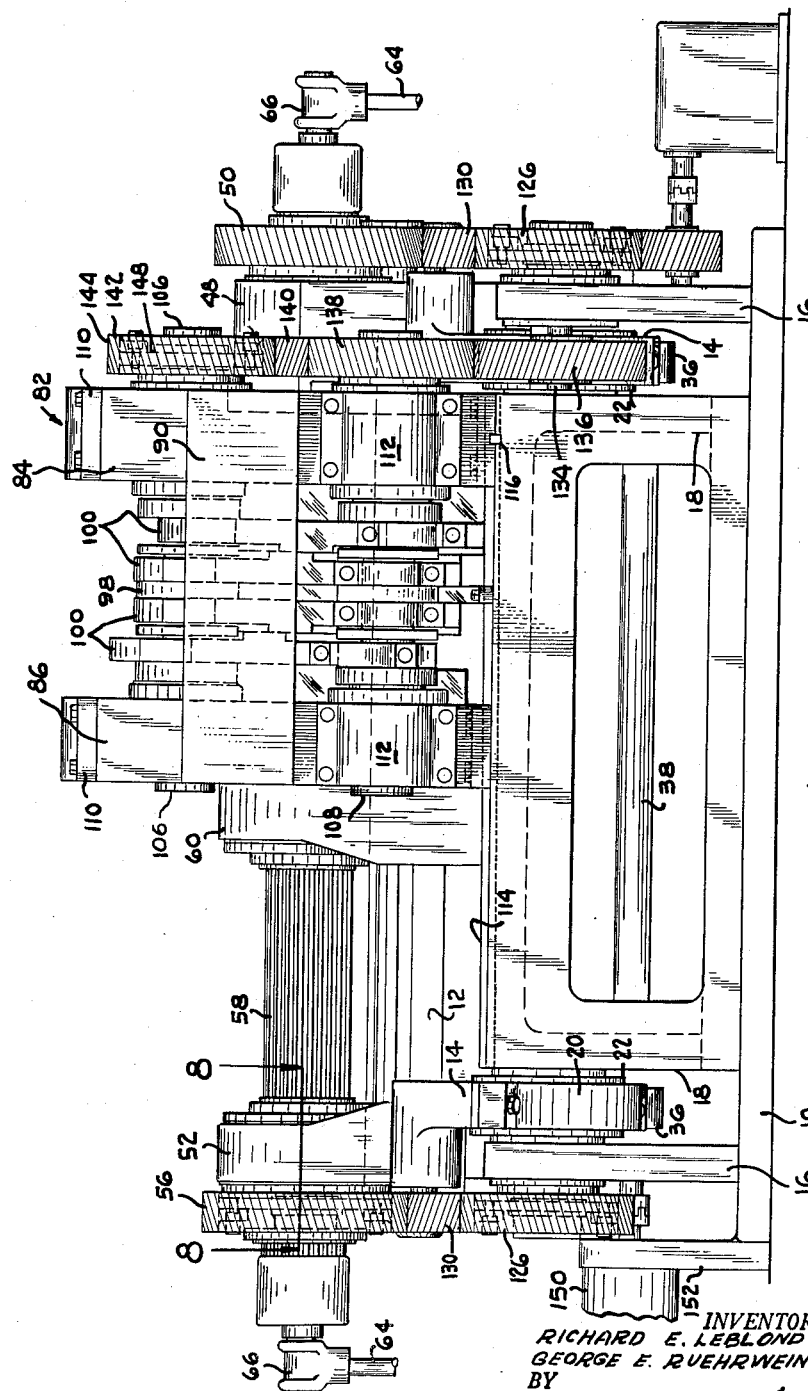

Dec. 19, 1961  R. E. LE BLOND ET AL  3,013,457
CRANKSHAFT LATHE AND METHOD OF OPERATION
Filed Feb. 4, 1959  10 Sheets-Sheet 8

INVENTORS
RICHARD E. LEBLOND
GEORGE E. RUEHRWEIN
BY
Toulmin & Toulmin
ATTORNEYS

Dec. 19, 1961   R. E. LE BLOND ET AL   3,013,457
CRANKSHAFT LATHE AND METHOD OF OPERATION
Filed Feb. 4, 1959   10 Sheets-Sheet 9
FIG.-11
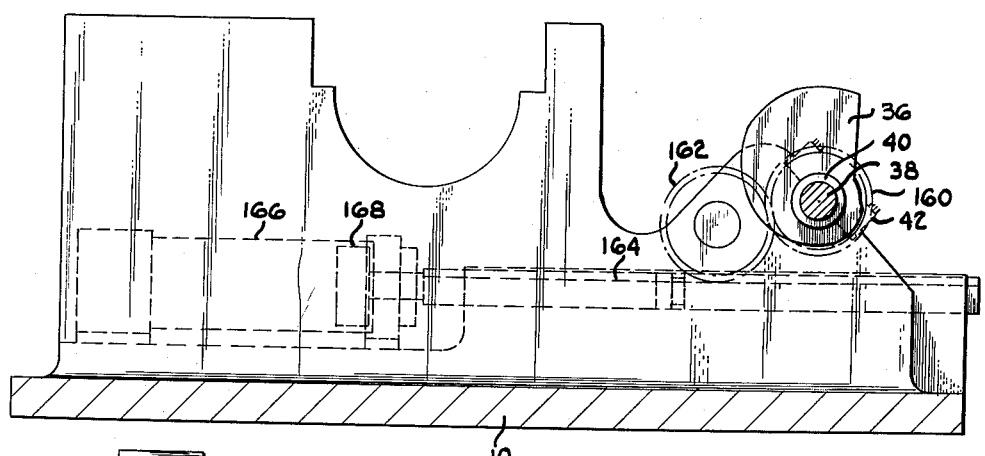
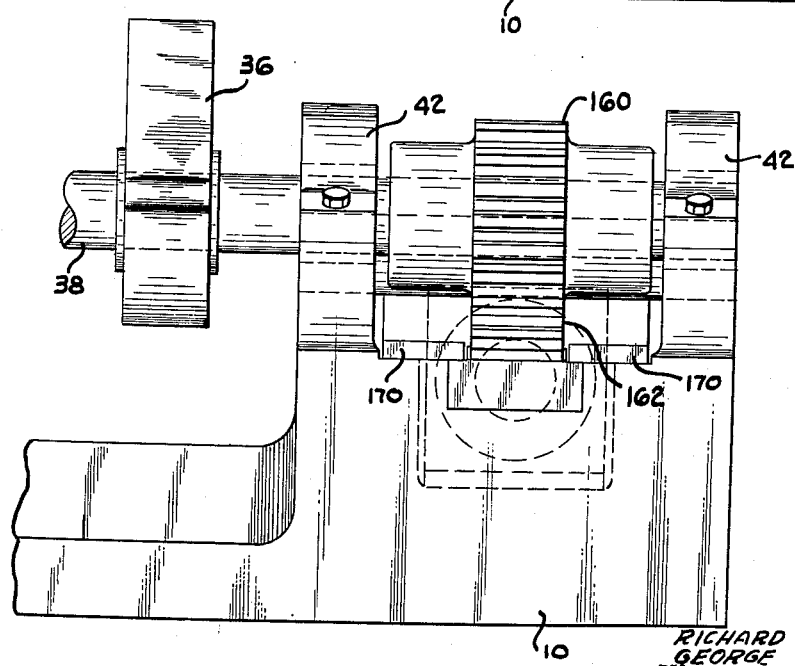
FIG.-12
INVENTORS
RICHARD E. LEBLOND
GEORGE E. RUEHRWEIN
BY
*Toulmin & Toulmin*
ATTORNEYS Dec. 19, 1961                R. E. LE BLOND ET AL                3,013,457
                    CRANKSHAFT LATHE AND METHOD OF OPERATION
Filed Feb. 4, 1959                                          10 Sheets-Sheet 10
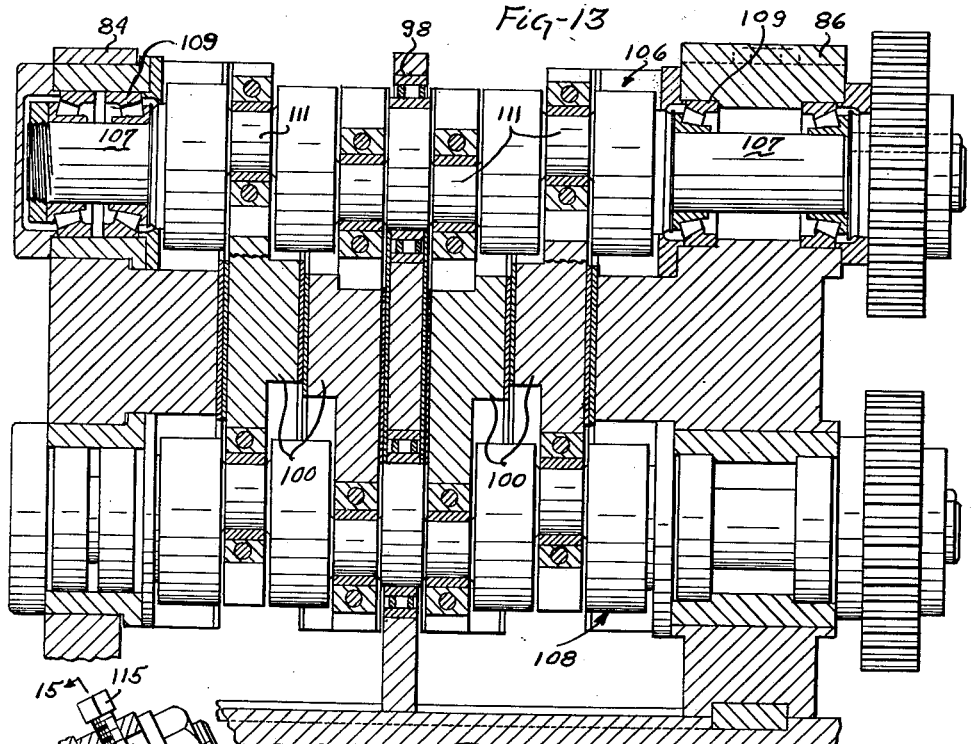
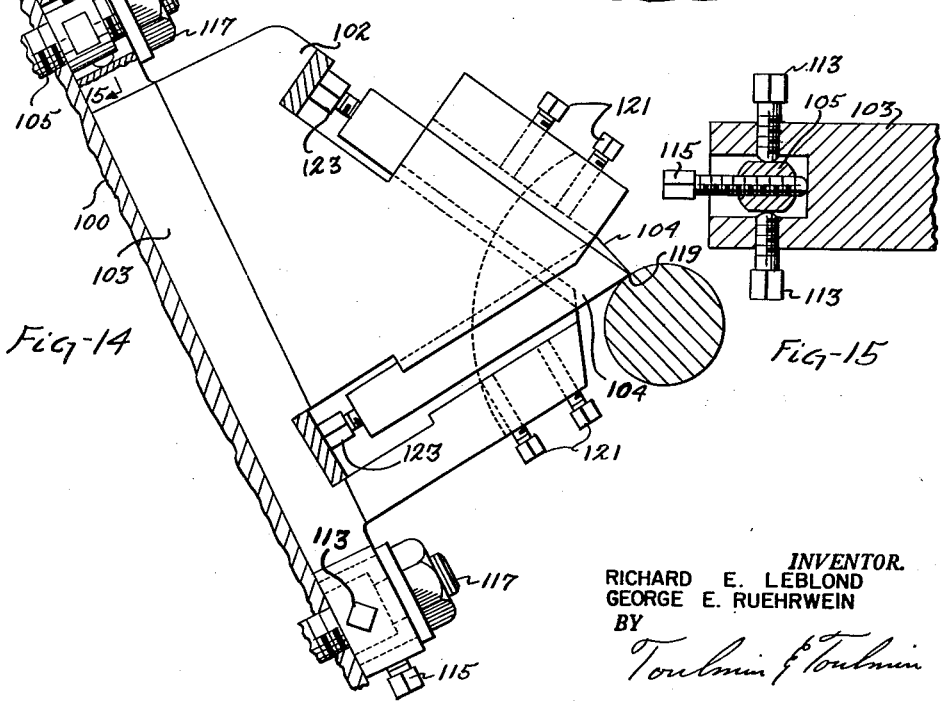
INVENTOR.
RICHARD E. LEBLOND
GEORGE E. RUEHRWEIN
BY
ATTORNEYS

United States Patent Office 3,013,457
Patented Dec. 19, 1961

3,013,457
CRANKSHAFT LATHE AND METHOD OF OPERATION
Richard E. Le Blond and George E. Ruehrwein, Cincinnati, Ohio, assignors to The R. K. Le Blond Machine Tool Co., Cincinnati, Ohio, a corporation of Ohio
Filed Feb. 4, 1959, Ser. No. 791,186
10 Claims. (Cl. 82—9)

This invention relates to apparatus for and methods of machining and is particularly concerned with such apparatus and method for machining elongated workpieces such as engine crankshafts.

In the machining of crankshafts, it has been customary heretofore to provide a special machine for each operation on each crankshaft. This practice has developed because the economical machining of crankshafts requires that there be carried out on the crankshafts multiple machining operations at one time. Thus, it is customary to machine substantially all of the line bearing areas of a crankshaft at one time and also to machine all of the crankpin areas at one time.

This has led to the development of special machines with each machine being especially constructed for a certain type crankshaft. Where the production of an engine manufacturer is limited to a certain type of engine, this situation is not particularly objectionable, but where a number of different engines are being manufactured, or where there is likelihood that the engine design will be changed, the purchasing of a plurality of special machines represents a great deal of expense and the possibility of the machines becoming obsoleted due to an engine change, and introduces the possibility of a substantial loss if the machine is resold or becomes unuseable.

Having the foregoing in mind, it is a particular object of the present invention to provide a machine which is readily adaptable to a plurality of different situations thereby substantially extending the utility of the machine.

Another object of this invention is the provision of a machine tool which is specialized to the extent that it is particularly adapted for a special class of workpieces, but which, in that class of workpieces, is readily adaptable to the operating of different sizes and shapes of workpieces.

A still further object of this invention is the provision of a machine tool, particularly adapted for the turning of crankshafts which is readily adjustable for receiving a plurality of different sizes of crankshafts.

A still further object of this invention is the provision of a machine tool adapted for carrying out a plurality of different specialized operations on workpieces falling within a specified general class of workpieces.

A still further object of this invention is the provision of a machine tool characterized in having a replaceable tool unit so that with one and the same base and workpiece supporting arrangement, a plurality of different workpieces can be operated.

In the machining of certain areas of certain types of workpieces, and notably the pin bearing areas of crankshafts, it has heretofore been the practice to mount the crankshaft on a fixed work axis and to rotate the crankshaft for machining the pin bearing areas with the machining being accomplished by turning tools that have orbital paths so that they follow the pins of the crankshaft and carry out the desired machining operation.

The tools are fed on their carriers as the machining proceeds to get the proper relative feed between the tools and workpiece. While such a structure operates satisfactorily, it involves special construction so that a machine of this nature is not readily adaptable to adjustment to permit it to accommodate workpieces of different sizes.

With this in mind it becomes a still further object of this invention to provide a machine tool, particularly a crankshaft lathe, in which the tool support arrangement is of a relatively simple nature so that it can be economically replaced by another structure of different size with the feed between the tools and workpiece being accomplished by feeding of the workpiece into the tools.

Another object of this invention is the provision of a machine tool such as a crankshaft lathe in which the work is fed into the tools for a work operation with the retraction of the work from the tools placing the work in position where it can readily be loaded and unloaded from the machine.

It is also an object of this invention to provide an improved method of machining workpieces such as crankshafts in which difficulties heretofore encountered in loading and unloading the crankshafts are eliminated.

These and other objects and advantages will become more apparent upon reference to the drawings in which:

FIGURE 7 is a rear elevational view of the machine with a portion of the bed broken away to show the gear train associated with the machine;

FIGURE 11 is a view showing a modified arrangement for actuating the cradle to cause feeding of the workpiece into the tools;

FIGURE 12 is an end view of the drive arrangement of FIGURE 11;

FIGURE 13 is a vertical sectional view indicated by line 13—13 on FIGURE 6;

FIGURE 14 is a side elevational view drawn at increased scale of one of the tool holders mounted on a tool block of the FIGURE 1 through 8 modification; and FIGURE 15 is a fragmentary sectional view indicated by line 15—15 on FIGURE 14 showing one of the adjustments pertaining to the tool holder of FIGURE 14.

Figure 1:
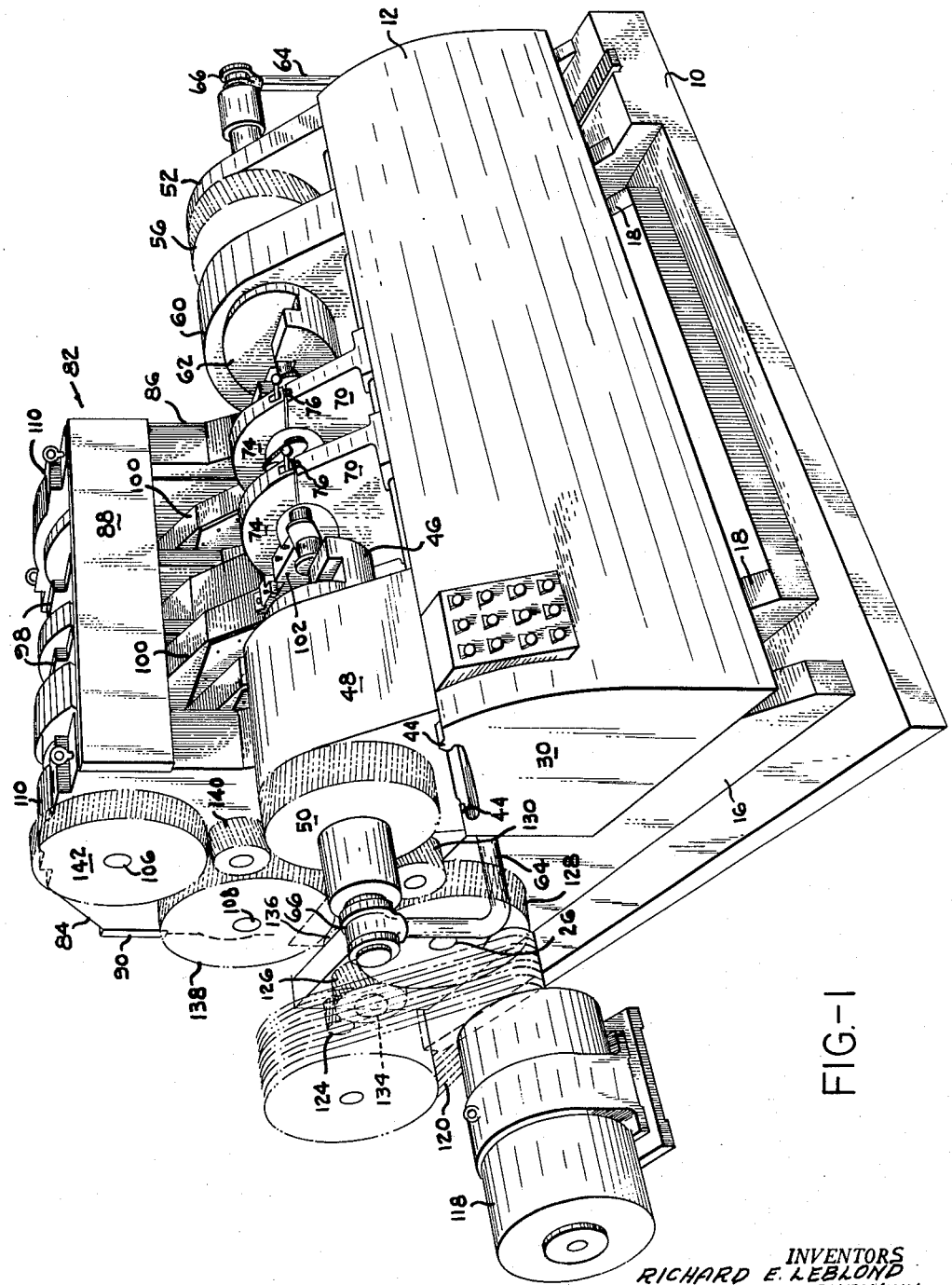
FIGURE 1 is a more or less diagrammatic perspective view showing a novel crankshaft lathe constructed according to the present invention.

Referring to the drawings somewhat more in detail, and particularly to FIGURES 1 through 8, the machine illustrated therein is a lathe. The workpiece illustrated is a crankshaft and the lathe is arranged for turning the pin bearing areas of the crankshaft, all of which are turned in one operation. The lathe in FIGURE 1 shows a six pin crankshaft being machined while in FIGURES 2 and 7 a four pin crankshaft is being machined.

Figure 3:
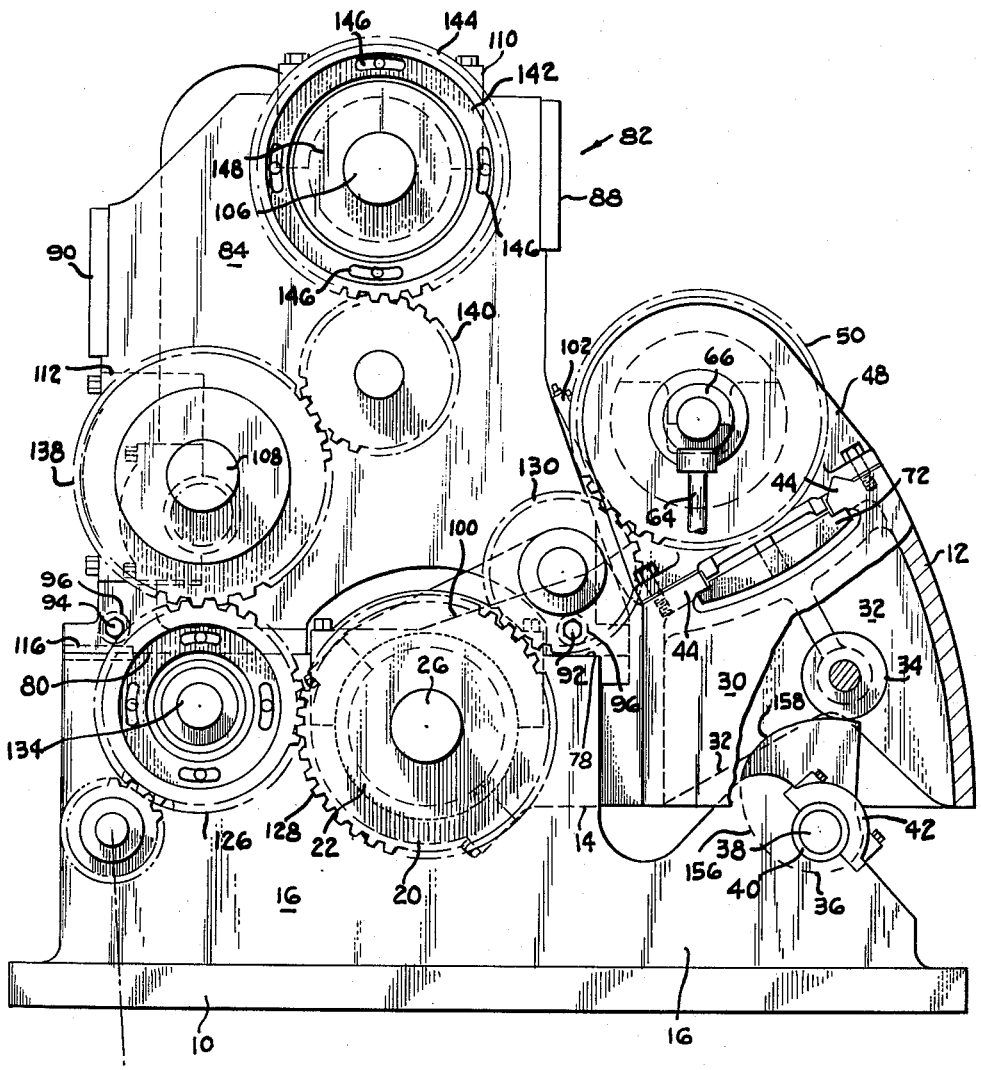
FIGURE 3 is a left end elevational view of the crankshaft lathe with the workpiece cradle partly broken away to show the feed arrangement for cradle.
Figure 4:
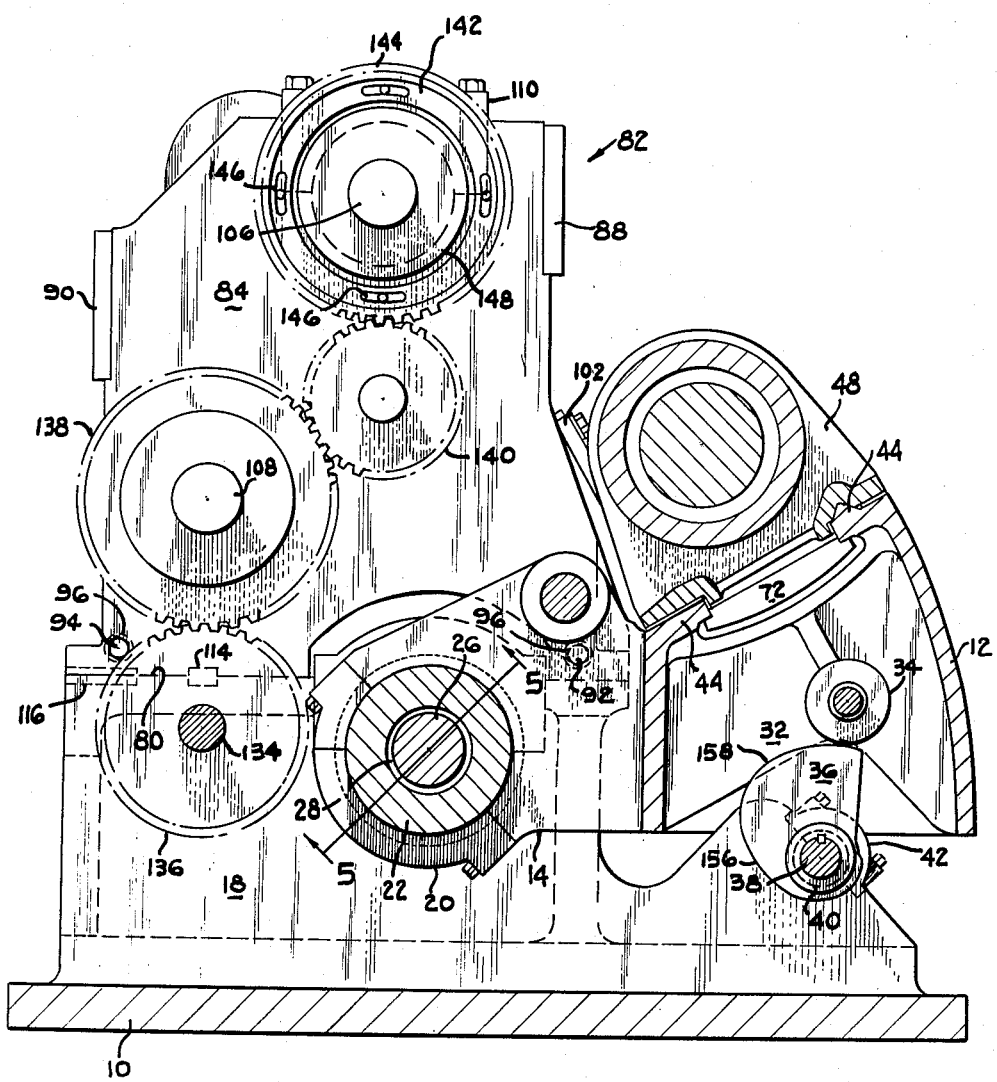
FIGURE 4 is a vertical sectional view indicated by line 4—4 on FIGURE 2 showing the pivotal support of the workpiece cradle.

The machine, as will be particularly noted in FIGURES 3 and 4 comprises a base portion 10. This base portion pivotally supports a workpiece cradle 12. Cradle 12 extends from end to end of the base and has arm 14 formed thereon extending rearwardly at the ends of the base. The base comprises at each end outer upstanding rib parts 16 and inner upstanding rib parts 18 between which the arms 14 of the cradle extend. (See FIGURE 7.) The inner ends of the cradle arms form half bearings and the bearing caps 20 are bolted to the inner ends of the arms as will be seen in FIGURE 4 to complete a bearing arrangement that surrounds the blocks 22 that are carried in the ribs 16 and 18 of the bed by being inserted in apertures provided therein for the blocks. This construction will be observed in FIGURE 5 wherein it will be noted that the blocks 22 also provide support for antifriction bearings 24 that support a shaft 26 that extends transversely through the bead and which shaft has clearance from blocks 22 as at 28.

Figure 2:
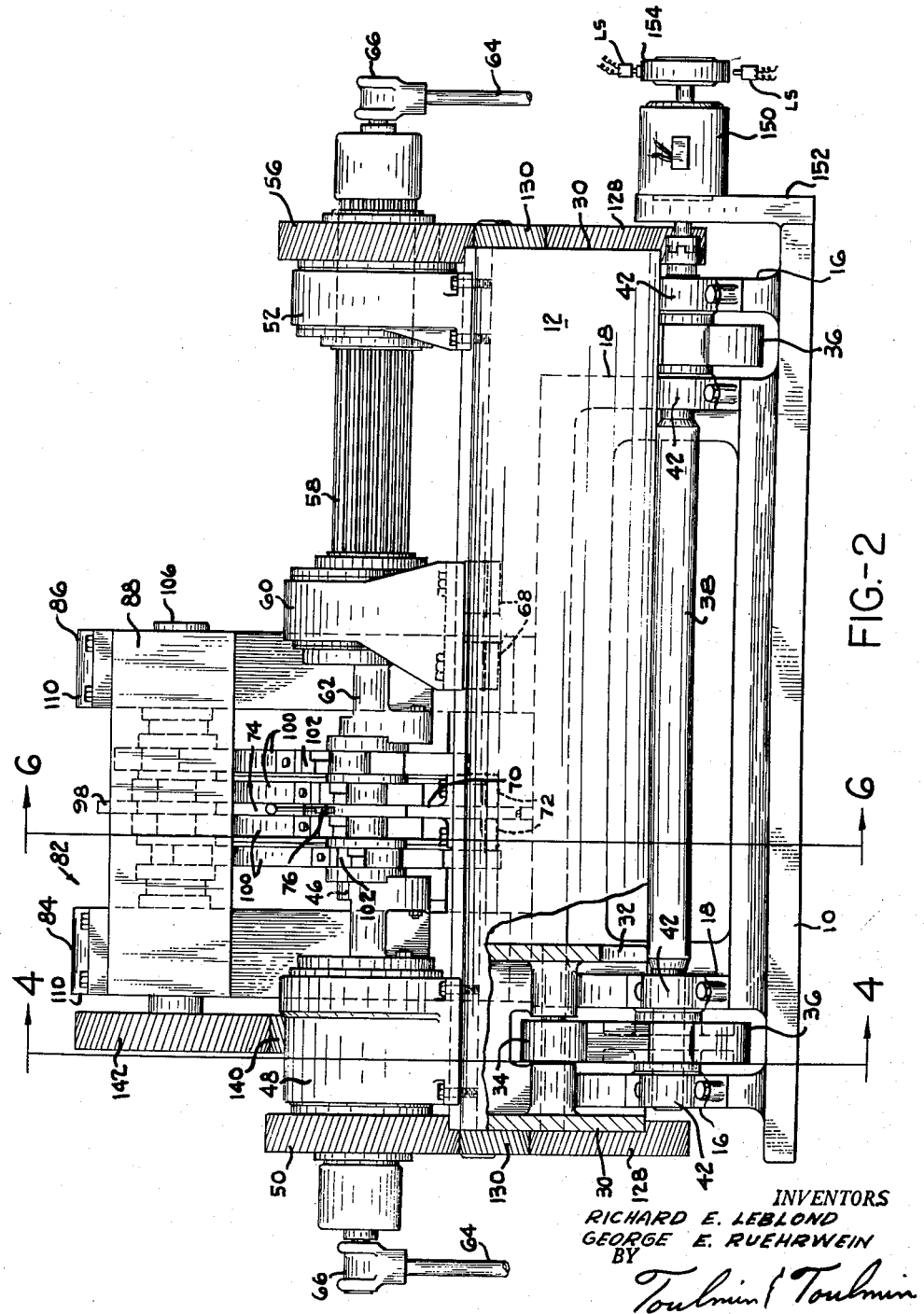
FIGURE 2 is a front elevational view of the lathe but shows a different crankshaft and a different tool arrangement than in FIGURE 1.

As will be seen in FIGURE 2, the workpiece cradle 12 has formed therein inwardly from the end walls 30, ribs 32. Between each end wall and its adjacent rib there is supported a roller 34. Each roller is engaged by a cam 36 keyed to shaft 38 extending transversely in the bed and journalled in the ribs 16 and 18 of the bed as by the bearing means 40 which include caps 42.

FIGURES 2, 3 and 4 will reveal the construction above described.

Figure 6:
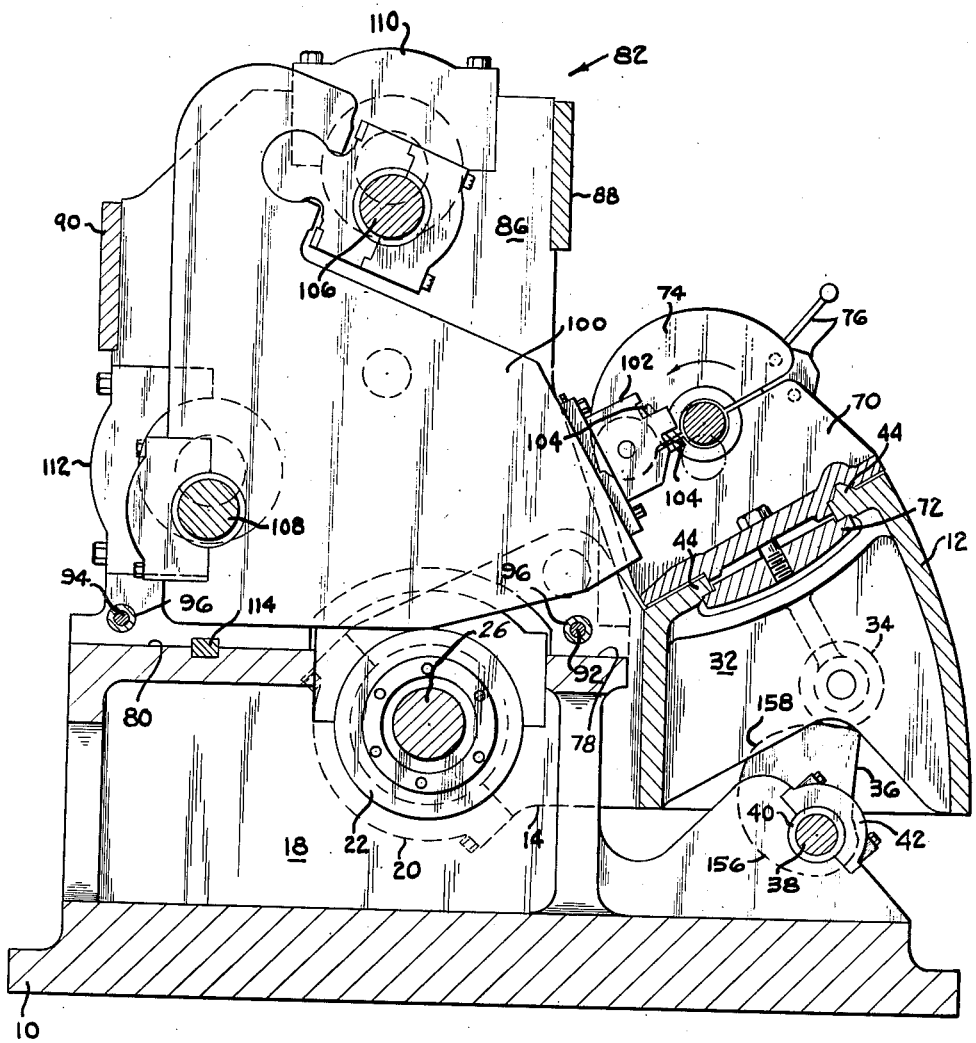
FIGURE 6 is a vertical sectional view indicated by line 6—6 on FIGURE 2 showing one of the orbiting tool blocks of the tool unit and the steady rests that supports the intermediate portion of crankshaft being operated.

FIGURES 3, 4 and 6 will reveal that the upper portion of cradle 12 is formed with ways 44 on which are supported the chucking devices for receiving workpieces. As will be seen in FIGURE 2 these chucking devices comprise a first chuck 46 at the left end of the cradle which is mounted on a shaft rotatably supported in a bearing block 48 bolted to the cradle and which shaft carries a gear 50 at the outer end of the cradle for driving the chuck 46 in rotation.

Figure 8:
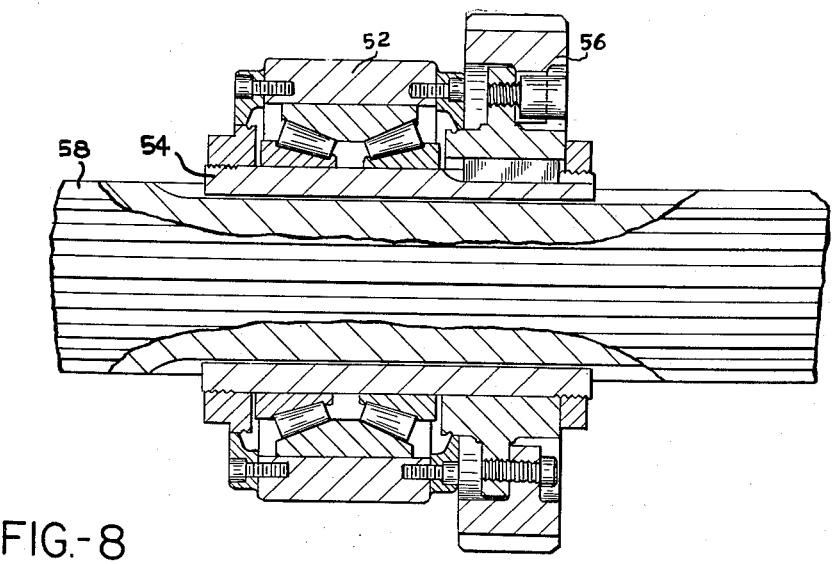
FIGURE 8 is a plan sectional view showing the support of one of the drive gears for a chuck of the workpiece cradle and a splined shaft associated therewith.

At the extreme other end of the cradle there is attached a second bearing block 52 within which, as will be seen in FIGURE 8, there is rotatably supported a sleeve 54 which has keyed to the outer end thereof drive gear 56. Sleeve 54 is internally splined and drivingly engages the externally splined shaft 58 so that shaft 58 is adjustable axially within sleeve 54 without disturbing the drive connection between gear 56 and shaft 58 via sleeve 54.

At its inner end shaft 58 is rotatably supported in bearing block 60 (FIGURE 2) and at the inner side of bearing block 60 the shaft has fixed thereto a second chuck 62 which is co-axial with the first mentioned chuck 46. The chucks may be identical in structure and may be actuated in any suitable manner, as, for example, by fluid pressure conducted thereto through passages within the supporting shafts from the conduits 64 which connect with the passages in the shafts through the rotary joints 66.

These chucks may vary considerably in structure but may, for example, comprise chucks as illustrated in FIGURES 35 and 36 of issued United States Patent 2,807,973 in the names of Meyer and Siekmann.

Bearing block 52 is fixedly bolted to cradle 12 whereas bearing block 60 in which the inner end of shaft 58 is journalled is slidable along the ways 44 of the cradle. Bearing block 60 is adapted for being fixed to the ways of the cradle in its adjusted positions therealong by the clamp blocks 68 (FIGURE 2) which is located in the cradle so as to engage the undersides of ways 44.

Depending upon the workpiece being machined, there also may be mounted on the cradle one or more steady rest structures 70 (FIGURES 2 and 6) which are adapted for engaging a bearing region along the workpiece on the axis of rotation thereof. Such a steady rest structure preferably comprises a base part resting on the ways of the cradle and clamped thereto as by the clamp blocks 72 with a cap part 74 being pivoted to the base part so that it can be opened to permit the workpiece to be inserted therein or removed therefrom.

A clamp arrangement 76 clamps the base and cap portions of the steady rest together and the steady rest preferably includes rollers that supportingly engage the portion of the workpiece about which the steady rest is closed.

With the six pin crankshaft of FIGURE 1, two of the the steady rests are employed, whereas with the four pin crankshaft of FIGURES 2 and 7, a single steady rest is employed.

The aforementioned bed 10 is formed with a transversely extending surface 78 extending laterally between the inner upstanding ribs 18 thereof (FIGURE 6). Rearwardly of lateral surface 78 on the bed is a second lateral support surface 80 also extending between the two inner ribs 18. These support surfaces are availed of for receiving and supporting the integral tool unit 82.

References to FIGURES 2, 3, 4, 6 and 7 will reveal that the tool unit 82 comprises a first end member 84 positioned toward the left side of the machine when viewed from the front and a second end member 86 spaced therefrom. These members are interconnected by transverse plates 88 in the front of the tool unit (FIGURE 2) and 90 in the back (FIGURE 7). Toward the bottom of the tool units the end members are connected by through bolts 92 in the front and 94 in the back, with there being spacers 96 surrounding the bolts (FIGURES 3 and 6). As will be seen in FIGURES 2 and 7, the tool unit comprises a center plate 98 which may be attached to plates 88 and 90 and through which the through bolts 92 and 94 extend. In the FIGURES 2 and 7 arrangement where a four pin crankshaft is being machined, there is a single one of intermediate plates 98, whereas, in FIGURE 1 where a six pin crankshaft is being machined, there are two of the intermediate plates 98.

Since the arrangement illustrated is for the purpose of turning crankpins of a crankshaft, tools are carried by the tool unit that take an orbital movement so as to follow the crankpins of the crankshaft as it rotates. This orbital movement is brought about by providing a tool block 100 (FIGURES 6 and 7) for each crankpin to be machined. These tool blocks are arranged in parallel relation, one in alignment with each crankpin to be machined, and mounted on each tool block is a tool holder 102 carrying tools 104 for engaging the crankpins to be machined. Tool holder 102 is preferably adjustable on its tool block longitudinally and laterally so that the tools can be brought into exact register with the crankpin to be machined thereby.

For causing the tool blocks 100 to take the necessary orbital movement, there extends between end members 84 and 86 of the tool unit the master cranks 106 at the upper end and 108 toward the lower end (FIGURES 1, 3, 4, 6 and 8). These cranks correspond with the crankshaft being machined as to the location of the pins, both longitudinally and angularly and the throws of the pins of master cranks are identical with the throws of the pins of the crankshaft being machined. The line bearings of the master crankshafts are journalled in end members 84 and 86 and the pin bearings are journalled in the tool blocks 100. Since the master crankshafts are geared together to rotate in unison, all parts of the tool blocks will take circular paths having a radius equal to the throw of a crankpin of the master crankshafts which is, of course, the same as that of the crankshaft being machined.

By rotating the two master cranks and the crankshaft being machined in unison and with all the crankshafts being exactly angularly oriented, all parts of the tool blocks will take exactly the same motions as the transverse center lines of the pins of the crankshaft to be machined thereby.

The master crankshafts 106 and 108 have their line bearings supported in antifriction bearings in the end members 84 and 86 and in the intermediate plate or plates 98. The upper master crankshaft has the bearing caps 110 attached to the end members to retain the bearings in position while the lower crankshaft 108 has the bearing caps 112 pertaining thereto (FIGURE 6).

The tool unit is exactly aligned on the base with the work axis of the workpiece cradle by providing transverse key means 114 (FIGURE 6) extending across the bed and engaging both of the end members and by the longitudinal key means 116 (FIGURES 3, 4, and 7) which interlocks the bed with the one end member 84. End member 86 is located transversely of the bed by its connection with end member 84.

For driving the master crankshafts and the crankshaft being machined, there is provided a drive motor 118 (FIGURE 1) which drives through belting 120 to a pulley that is fixed to a pinion 124 that meshes with idler gear 126 on the bed. Idler gear 126 meshes with gear 128 that is attached to one end of the previously mentioned shaft 26 which extends transversely through the bed.

This is also the shaft about which the cradle 12 is tiltable. There is a gear 128 at each end of shaft 26 (FIGURES 2 and 7). Each gear 128 meshes with an idler gear 130. Each idler gear 130 meshes with one of the chuck driving gears. The idler gear 130 at the left meshes with chuck driving gear 50 and the idler gear toward the right end of the machine meshes with chuck driving gear 56.

Gear 126 on the left side of the machine as viewed from the front is mounted on a shaft 134 journaled in the bed. On the shaft 134, on the inside of the outer rib 16 of the bed is a second gear 136 of the same size as gear 126. Gear 136 meshes with a gear 138 attached to the end of the lower master crankshaft 108 on the outside of end member 84. This will be seen in FIGURES 1, 3, 4, and 7.

Gear 138 also meshes with an idler gear 140 rotatably supported on end member 84 and which in turn meshes with gear 142 attached to the upper master crankshaft 106. Gear 142 is the same size as gear 138 and therefore the master crankshafts rotate in unison and in the same direction.

These gears are also the same size as the chuck actuating gears 50 and 56 and therefore the chucks and the workpiece supported therein also rotate in unison with the master crankshafts.

The orientation of the master crankshafts is critical and accordingly at least one of the crankshaft gears 138 and 142 is constructed so as to consist of an outer toothed portion 144 adjustably connected as by the bolt and slot means 146 with a hub 148 fixed to the shaft to be driven (FIGURES 3 and 7).

By availing of this adjustment the two master crankshafts can be brought into exact angular orientation.

Similarly, it is essential for the chucks to be exactly oriented with the master crankshafts and to this end gear 126 is similarly constructed (FIGURE 3) so that it is angularly adjustable relative to shaft 134 and therefore relative to gear 136.

A third critical adjustment is in connection with the two chucks. These must be exactly aligned with each other and for this purpose gear 56 pertaining to the adjustable chuck is formed so that the outer toothed portion thereof can be adjusted relative to the chuck which it drives (FIGURE 8).

The provision of the several adjustments referred to above permits exact orientation of all of the rotating parts of the machine when it is set up.

Returning to the workpiece cradle, this member is rocked upwardly about its pivotal connection with the base of the machine by rotation of the cams 36 (FIGURES 2, 3, 4 and 6). This is accomplished by driving shaft 38 to which the cams are keyed in rotation. One way of driving this shaft in rotation is illustrated in FIGURE 2 wherein there is a rotary hydraulic motor 150 coupled to the shaft and supported on an upright flange 152 formed on the base of the machine.

Also connected with shaft 38 to rotate in unison therewith is a cam wheel 154 (also seen in FIGURE 2) carrying cams for actuating feed control limit switches designated LS and which operate, through means not shown, to control the speed and amount of travel of the hydraulic motor 150 and therethrough to control the rocking of the cradle which determines the feeding of the workpiece into the tools.

As will be seen in FIGURES 3, 4 and 6, the cradle actuating cams comprise a rapid rise 156 during which the cradle is moved rapidly toward working position, and a slower rise 158 during which the workpiece is fed into the tools for a turning operation. There may be provided a dwell portion on the cams or the feed of the cams may be interrupted to permit the workpiece to dwell at the end of the cutting operation.

A preferred arrangement for rotating the cam shaft is illustrated in FIGURES 11 and 12. In these figures it will be seen that the cam shaft 38 has a gear 160 attached thereto which meshes with an idler gear 162 in the bed engaged by reciprocating rack 164. Rack 164 is attached to or forms a part of a ram which extends into a cylinder 166 in the bed and wherein there is attached to the ram, piston 168. The rack 164 is guided in the bed as by gib means 170 as will be seen in FIGURE 12.

From the foregoing detailed description of the construction of the machine it will become apparent that the machine can readily be adjusted to accommodate workpieces of different size. For example, crankshafts of three, four, six or eight throws could readily be accommodated in the machine.

What this would involve would be the removing of the tool unit 82 from the base of the machine and the replacement thereof with a tool unit having the proper number of tool blocks therein with master cranks associated with the tool blocks corresponding to the crankshaft to be machined. The provision of the proper number of steady rests to engage intermediate line bearing portions on the cradle and the adjustment of the movable chuck 62 by moving its bearing block 60 will then put the machine in condition for operation.

It is understood that the placing of the tool unit on the machine would be accompanied by checking of the orientation of the master crankshafts of the tool unit with the chucks and of the chucks with each other.

Ordinarily, the provision of gage marks on the separable gears and the locking of the gears of the tool unit in position at the time of removing the tool unit from the machine, would permit accurate timing of the machine upon the placing of a tool unit thereon so that only minor adjustments by way of the adjustable gears would be necessary.

It will be appreciated that the machine according to the present invention is versatile and has wide application since it can be adapted for the turning of a plurality of different workpieces falling within a general class. In the particular case described in detail, the class of workpieces are crankshafts and within this class of workpieces any crankshaft within the limits of the capacity of the machine, regardless of the number and location of pins could be placed therein and all of the crankpin bearings turned simultaneously. The distinct advantage is thus had that a single machine can be provided in connection with which there is little danger of obsolesence and which can be provided with a plurality of interchangeable tool units, each of which will cost only a fraction of what an entire machine would cost.

Considerable saving to the machine purchaser is thereby effected and at the same time the machine which he does purchase imposes no great limitations as to the type of workpiece that can be produced thereon.

The rocking of the workpiece cradle about a pivotal connection with the bed is considered to be a novel feature and is influential in imparting flexibility and adjustability to the entire machine organization since it permits the tool units to be constructed more simply than when the feeding to the tools is embodied in the tool blocks. Furthermore, the feed of the workpiece into the tools is greatly simplified by the arrangement of the present invention because a single feeding mechanism of a simple nature is all that is required to accomplish the feeding. The rapid advance and rapid retraction and slow feed and dwell of the workpiece relative to the tools can be accomplished by the shape of the cams and the control of a single hydraulic actuating motor.

The rockable workpiece supporting cradle offers another advantage which has to do with the conveying of workpieces to and from the work axis of the machine.

Crankshafts, for example, are usually large and heavy and are difficult to handle manually. Power loading devices are thus usually necessary but in most lathes of this nature the work axis is located inwardly of the machine so that complicated swinging hook arrangements have been employed to put the crankshafts into position in the machines and to remove them therefrom.

With the arrangement of the present invention however, the workpiece axis, when the workpiece is retracted, is readily accessible from directly above the machine and workpieces can therefore be conveyed to and from the machine by relatively simple instrumentalities which could move transversely of the machine or longitudinally thereof so that the machine could readily be placed in an automated production line or crankshafts transferred from one side of the machine to the work axis and therefrom to the other side of the machine.

It will be understood that the construction of the tool unit will be such that the tool blocks are supported for exact planar movement at all times and for this purpose there will be wear plates between adjacent tool blocks and between the tool blocks and the end members and intermediate member or members of the tool unit. This provides for a substantially solid mass of metal transversely through the tool unit that adequately supports and guides the tool blocks at all times. The machine is therefore as accurate and rigid as the conventional machine in which the end members of the tool portion are integral with the machine base.

In connection with the strength and rigidity and accuracy of the machine, it will be noted that shaft 26 through which the chucks are driven in unison from the gears on the opposite ends of feed shaft is large and heavy so that it will not twist the turning loads imposed on crankshafts, particularly long crankshafts.

Figure 5:
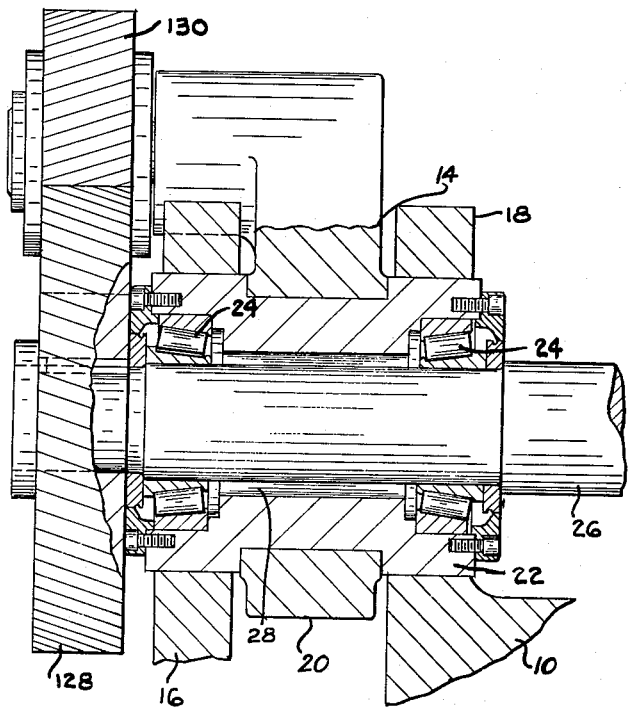
FIGURE 5 is a sectional view indicated by line 5—5 on FIGURE 4 showing the journal by means of which the cradle is pivotally supported on the bed of the machine.

Furthermore, this shaft is supported in both of the ribs 16 and 18 of the base as will be seen in FIGURE 5. This support is by way of the massive anti-friction bearing 24, blocks 22 and the large bearing caps 172 that retain the blocks in position in the base 10.

Figure 9:
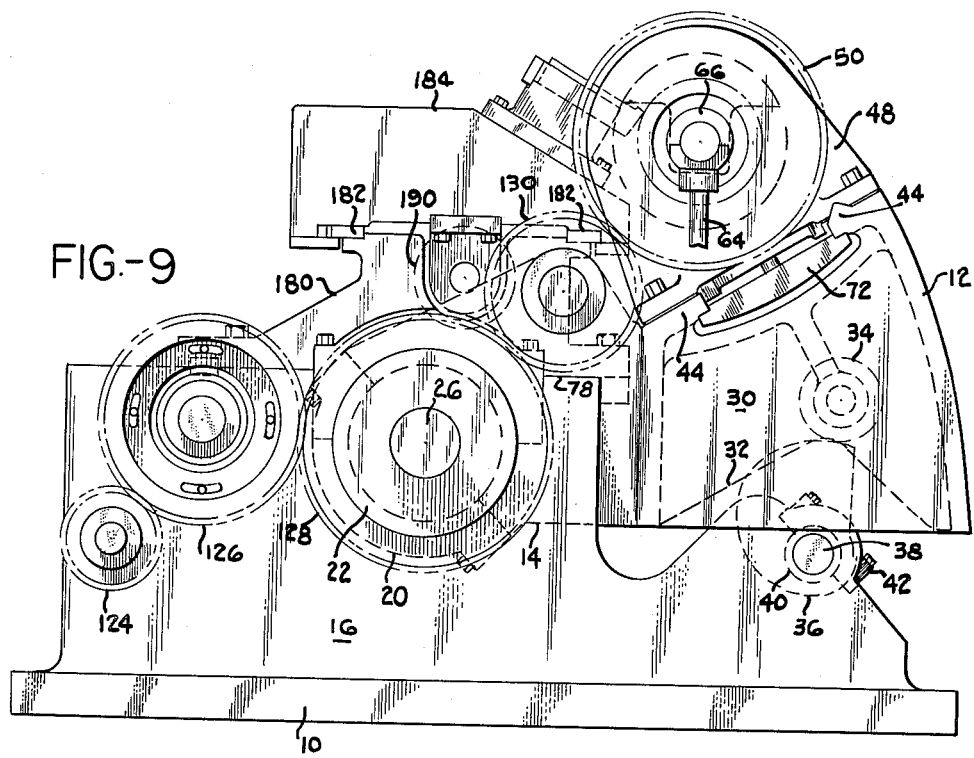
FIGURE 9 is an end elevational view showing modified rrangement of the machine in which the same bed and workpiece cradle and the gear train pertaining thereto are utilized for carrying out a different machining operation on a workpiece.
Figure 10:
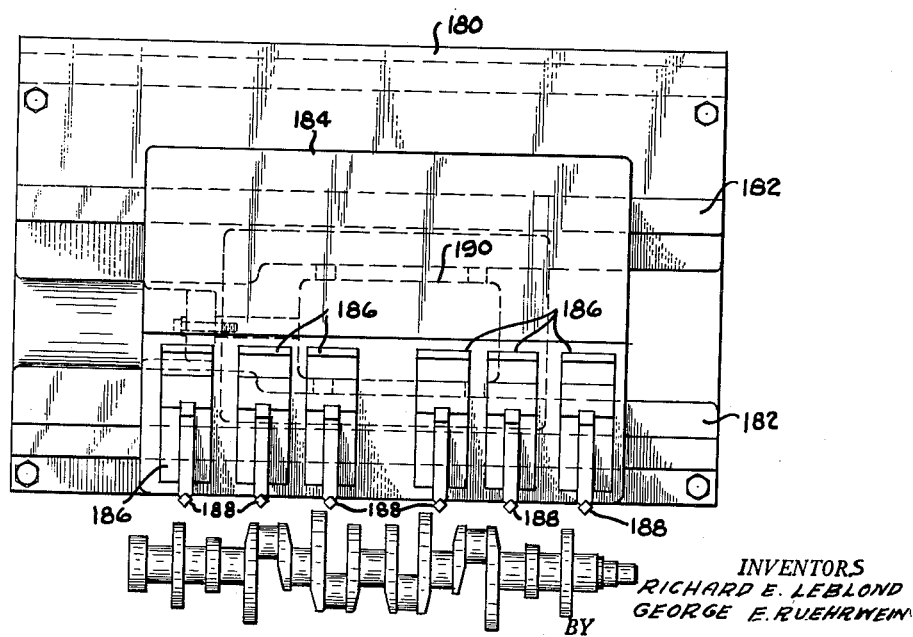
FIGURE 10 is a plan view showing more or less diagrammatically the modification of FIGURE 9.

The adaptability of the basic machine arrangement of the present invention is further illustrated in FIGURES 9 and 10 where it is shown as modified for what is referred to as a "topping" operation. In a topping operation the various lobes of the crankshaft are turned down to a predetermined radius. In this operation since all of the turning takes place concentric with the axis of rotation of the workpiece, no orbital movement of the tools is necessary. The tools can thus be supported on a tool unit of a considerably simpler nature than the tool unit described in connection with the first modification. The tools in the FIGURES 9 and 10 modification merely move axially of the workpiece so that the lobes of the crankshaft are machined down to a predetermined size from end to end.

Referring to FIGURES 9 and 10, the same reference numerals are utilized for the workpiece cradle and the base as were utilized in the first described modification. The tool unit however, in this modification consists of a bed portion 180 attached to base 10 of the machine and which bed portion 180 comprises longitudinally extending ways 182 on which a carriage or elongated tool support 184 is mounted. This tool support carries a plurality of individual tool blocks 186 in which tools 188 are mounted. A hydraulic motor 190 is connected between carriage 184 and bed portion 180 for driving the carriage longitudinally of the bed portion.

In operation of the FIGURES 9 and 10 modification, the workpiece is placed in the chucks and is clamped therein and the cradle is rocked to its upper rock position and the hydraulic motor 180 is actuated to move carriage 184 longitudinally thus to top the crankshaft lobes. Should more than one such cut be necessary, the cams and cam shafts could be controlled so as to position the cradle farther inwardly for successive traversing movements of carriage 184.

A feature in connection with both of the above described modifications is in the location of the pivot axis for the rockable workpiece cradle. This axis is so located that as the workpiece rotates and the cutting tools operate thereon, the line of the resultant force acting on the workpiece, and which force, is of course, transmitted to the cradle, is in the general direction away from the pivotal axis of the cradle. Due to the massive support arms and support blocks for the cradle this has a tendency to inhibit chattering and vibration and likewise to minimize the thrust on the cradle feed mechanism.

The counter force, developed on the turning tools, and therefore transmitted to the tool unit is accordingly downwardly and toward the back of the tool unit and this thrust is adequately sustained by the heavy base of the machine and the large transverse key that keys the tool units to the base. This also inhibits chattering and reduces deflection of the machine parts to a minimum.

The foregoing examples include the two basic types of turning operations that are carried out on workpieces such as crankshafts and it will accordingly be understood that the machine could also be adapted to the turning of the line bearing areas of a crankshaft.

In turning the line bearing areas of a crankshaft, instead of chucking the crankshaft at the end, it is supported in one or more center drive chucks and which are chucks that clamp about the webs at opposite sides of a pin bearing of the crankshaft and drive it in rotation thus leaving all of the line bearing areas supported for cutting.

By the provision of one or more center drive chucks on the ways of the workpiece cradle, the turning of the line bearing areas could be carried out.

The tool unit for such a lathe would comprise a unit to be bolted to the base of the machine with the tools being stationarily mounted in the tool unit except for the minor adjustability thereof necessary to bring them into exact register with the line bearing areas to be turned thereby.

The feeding of the crankshaft into the tools would be accomplished merely by rocking the cradle in the manner already described.

A particular feature of the present invention is the detachable tool unit. As has been mentioned, these units can be made up much more cheaply then an entire special machine and this gives the purchaser of the machine a distinct advantage in that the machine can be converted at relatively low cost for operating different workpieces.

In the machining of the crankpins of the crankshafts all of the parts must be most precisely timed to produce accurate workpieces. According to the present invention the timing of the crankshafts in the tool unit can be accomplished at the time of manufacturing the tool unit so that it can be shipped to the user with the tool unit precisely timed and in condition for producing accurate workpieces as soon as it is placed on the machine, it being understood that the tool unit will be timed with the drive for the chucks by means of gauge marks or the like on the gears that form the actual connection between the tool unit and the gearing on the base portion of the machine.

FIGURE 13 shows the manner in which the orbiting tool blocks 100 are mounted on the master cranks therefor. The master cranks are indicated by the reference numerals 106, at the upper portion of the machine, and 108 toward the lower portion. The master cranks have the line bearing portions 107 that are supported in antifriction bearings 109 in the end members 84 and 86 and in the intermediate plate or plates 98.

The master crankshafts also comprise the pin bearing portions 111 which are journalled in the tool blocks 100. The master crankshafts 106 and 108 as has been explained previously, are oriented angularly exactly with each other and are also exactly oriented angularly with a workpiece supported in the chuck means of the machine. Further, the chuck means and the master crankshafts are geared together so as to rotate in the same direction and at the same speed. This orienting and synchronizing of the master crankshafts and of the crankshaft being machined causes the tool blocks 100 to orbit and follow the pin bearings of the crankshaft being machined whereby the several pins of the crankshaft being machined are turned to true cylindrical configurations.

It will be understood that the master crankshafts correspond exactly with the crankshaft being machined with respect to the axial spacing apart of the pin bearing portions and as to the angular displacement of the pin bearing portions from each other and as to the amount of throw of the pin bearing portions.

In FIGURE 13 there are shown master crankshafts having four pins with two being off-set from the axis of rotation of the master crankshafts in one direction and the other two being off-set therefrom in the opposite direction. It will be understood, however, that the master crankshafts could be constructed in any desired manner for as many pin bearing portions as desired disposed in any desired manner about the axis of the crankshaft.

FIGURES 14 and 15 illustrate one of the tool holders 102 somewhat more in detail and also illustrates the manner in which the tool holders are arranged for being adjustably supported on the tool blocks 100.

Each tool holder 102 comprises a base 103 having apertures in its opposite ends through which studs 105 pass and which studs are threaded into the pertaining tool block 100. The base 103 is laterally adjustable relative to studs 105 by the screws 113 threaded through the base and engaging opposite sides of the center portions of the studs 105. This will provide for the desired degree of lateral adjustability of base 103 on its pertaining tool block. The base 103 of each tool holder is also adjustable longitudinally of the face of the tool block by means of the screws 115 that are threaded through the enlarged center portions of studs 105 and which abut the inner ends of the apertures in the opposite ends of the base 103. Clamp nuts 117 are provided on the studs 105 for clamping the base 103 fixedly into position on the tool block when the aforementioned adjustments have been made.

As to the tools 104, previously referred, these are arranged in side by side relation in angularly directed slots so that the cutting edges of the tools at 119 are in alignment for engaging the periphery of the pin bearing portions being turned thereby. These tools are adapted for being clamped in position by the clamp screws 121, and are adjustable in the direction of their lengths by means of the abutment screws 123 that engage suitable abutment areas on the tool holder 102. The particular manner of providing tool supports in connection with the present invention forms no part of the invention beyond the fact that the tools are adjustably supported on the tool block and can, therefore, be brought into precise registration with the work to be machined whereby to produce accurately machined crankshafts in the lathe of the present invention.

It will be understood that this invention is susceptible to modification in order to adapt it to different usages and conditions; and, accordingly, it is desired to comprehend such modifications within this invention as may fall within the scope of the appended claims.

We claim:

1. In a machine tool; a base, a cradle pivoted to the base, chuck means on the cradle defining a work axis and adapted for receiving a workpiece, a tool unit detachably mounted on the base comprising tools movable therein for operating on a workpiece gripped in the chuck means, means for rocking the cradle about its pivotal support to carry a workpiece therein into operative relation with the tools in said tool unit, means for thereafter feeding the tools and workpiece relatively for a machining operation, a first train of gears on the cradle for driving the chuck means said train of gears including a gear on the axis of the chuck means and also including one gear on the pivot axis of the cradle for driving the chuck means in all tilted positions on the cradle, a second train of gears on the base in mesh with said one gear, a third train of gears on the tool unit for driving the tools therein and arranged to mesh with the train of gears on the base in response to the positioning of the tool unit on the base, the said means for rocking the cradle about its pivotal support comprising spaced actuators carried by the base and engaging the cradle adjacent the opposite ends thereof.

2. In a machine tool; a base, a cradle pivoted to the base, chuck means on the cradle defining a work axis and adapted for receiving a workpiece, a tool unit detachably mounted on the base comprising means to support tools for operating on a workpiece gripped in the chuck means, means for actuating the chuck means and tool unit in synchronism, means for rocking the cradle about its pivotal support to carry a workpiece therein into operative relation with tools in said tool unit, means for thereafter feeding the tools and workpiece relatively for a machining operation, a gear train leading from the chuck means and including a gear means on the pivot axis of the cradle for driving the chuck means in all tilted positions on the cradle, the said means for rocking the cradle comprising spaced cams adjacent opposite ends of the cradle, a shaft rotatably supported in the base and supporting said cams, a motor for rotating said shaft, and means controlled by rotation of said shaft for controlling said motor.

3. A machine tool; a base, a cradle pivoted to the base, chuck means on the cradle defining a workpiece axis and adapted for receiving a workpiece, a tool unit detachably mounted on the base independently of said cradle comprising means to support tools for operating on a workpiece supported in the said chuck means, cams carried by the base rotatable for rocking the cradle about its pivotal support to carry a workpiece therein into operative relation with tools in said tool unit, means for thereafter feeding the tools and workpiece relatively for a machining operation, first gear means carried by the cradle for driving said chuck means to rotate the workpiece while it is being machined, second gear means carried by the tool unit for driving the tools, and third gear means carried by the base meshing with said first and second gear means so arranged that the tool unit and the said second gear means carried thereby can be detached from the base without disturbing the cradle or the said first and third gear means.

4. In a machine tool; a base, a cradle supported on the base toward one side thereof, said cradle having spaced arms extending along the sides of said base, means pivotally connecting the arms with the base, cams carried by the base rotatably for rocking the carriage about its pivotal connection with the base, said base having a machined surface thereon, a tool unit adapted for being received on said machined surface, key means keying the tool unit to the base to locate it precisely thereon, tools carried by the tool unit for operating on a workpiece in the cradle when the cradle is rocked about its pivotal support on the base, said cradle comprising spaced chucks for supporting the workpiece and at least one of said chucks being adjustable along the cradle whereby the chucks can be adjusted relatively to receive a workpiece corresponding to a particular tool unit mounted on the base, drive gears for driving the chucks including a gear on the cradle on the pivot axis of the cradle, a train of gears on the base in mesh with the said gear on the pivot axis of the cradle, and drive gears for the tool unit carried thereby including a gear engageable with one of the gears of said train of gears when the tool unit is positioned on the base.

5. In a machine tool; a base, a cradle supported on the base toward one side thereof, said cradle having spaced arms extending along the sides of said base, means pivotally connecting the arms with the base, cams carried by the base rotatably for rocking the carriage about its pivotal connection with the base, said base having a machined surface thereon, a detachable tool unit adapted for being received on said machined surface, key means keying the tool unit to the base to locate it precisely thereon, tools carried by the tool unit for operating on a workpiece in the cradle when the cradle is rocked about its pivotal support on the base, said cradle comprising spaced chucks for supporting the workpiece and at least one of said chucks being adjustable along the cradle whereby the chucks can be adjusted relatively to receive a workpiece corresponding to a particular tool unit mounted on the base, said cradle also being adapted for adjustably and detachably receiving steady rest means for supporting a workpiece between the said chuck means, drive gearing for driving the chucks including a drive gear on the pivot axis of the cradle, a train of drive gears on the base meshing with the said drive gear on the pivot axis of the chuck, drive gears for the tool unit carried thereby and including a gear adapted for engaging one of the gears of the train of drive gears on the base when the tool unit is positioned on the base.

6. In a machine tool, a base, a cradle adjacent the base at one side, arms on the cradle extending inwardly adjacent the ends of the base, means pivotally engaging the inner ends of the arms for rockably supporting the cradle on the base, tool means carried by the base for operating on a workpiece carried by the cradle when the cradle is rocked about its pivotal connection with the base, the upper surface of the said cradle being formed with ways extending therealong parallel with the pivot axis of the cradle on the base, a chuck fixedly mounted on the ways at one end of the cradle, a second chuck adjustably mounted on the ways at the other end of the cradle, drive gears rotatably mounted at opposite ends of the cradle for driving said chucks, said drive gears being stationarily mounted along the cradle, and a splined shaft attached to the said second chuck and extending through the drive gear pertaining thereto.

7. In a machine tool; a base, a cradle, arms on the cradle extending adjacent the ends of the base, means pivotally connecting the inner ends of the arms with the base, a shaft extending through the base on the pivot axis of the cradle thereon, spaced chucks on the cradle, a chuck drive gear rotatably mounted at each end of the cradle, gear trains connecting opposite ends of the said shaft with said chuck drive gears, one of said chucks being adjustable longitudinally of the cradle, a splined shaft attached to the said one chuck and extending through and slidably drivingly interconnected with the drive gear pertaining thereto.

8. In a machine tool; a base, a cradle pivoted to the base, a tool unit detachably mounted on the base, tools in the tool unit for operating on a workpiece carried by the cradle, tool blocks in the tool unit supporting the tools, master crankshafts in the tool unit rotatable for causing the tool blocks to take orbital movements, gear carried by the tool unit interconnecting the master crankshafts, gears carried by the base engageable with the gears on the tool unit when the tool unit is placed on the base for driving the gears in the tool unit, and a gear train carried by the cradle engaging the gears on the base and including a gear on the pivot axis of the cradle so the workpiece is driven in all adjusted positions of the cradle on the base.

9. In a crankshaft lathe; a base, a tool unit detachably mounted on the base toward one side thereof, a cradle positioned over the base to the side of the tool unit, arms on the cradle extending inwardly adjacent the ends of the base, means pivotally supporting the ends of the arms on the base, spaced chuck means on the cradle, one thereof being adjustable toward and away from the other whereby a crankshaft corresponding to the particular tool unit on the base can be engaged by the chuck means, said cradle being rockable toward the tool unit for a machining operation and away from the tool unit for loading and unloading of the crankshaft, and the cradle when rocked backwardly being spaced laterally from the tool unit so the space above the cradle is unobstructed by the tool unit whereby the crankshaft can be loaded and unloaded from directly above the cradle.

10. In a detachable tool unit for a machine tool having a base portion adapted for receiving the said tool unit in a fixed location, said tool unit comprising spaced end plates and intermediate plate means, a plurality of tool blocks closely fitted between the end plates and the plate means whereby substantially a solid mass of metal exists between the outer faces of the end plates, spaced master crankshafts having line bearing portions journalled in the end plates and plate means and pin bearing portions journalled in said tool blocks, said end plates and plate means being rigidly interconnected in fixed spaced relation, a transverse keyway formed in the bottom of said end plates and plate means to key the unit to the machine tool base portion, and a longitudinal keyway formed in one end plate for further keying the unit to the said base portion.

References Cited in the file of this patent

UNITED STATES PATENTS

| | | |
|---|---|---|
| 916,646 | Anderson | Mar. 30, 1909 |
| 1,354,453 | Nueske | Aug. 28, 1920 |
| 1,431,919 | Baerbalck | Oct. 17, 1922 |
| 1,993,994 | Groene et al. | Mar. 12, 1935 |
| 1,993,995 | Groene et al. | Mar. 12, 1935 |
| 2,089,421 | Pierle | Aug. 10, 1937 |
| 2,559,258 | Olson | July 3, 1951 |
| 2,585,215 | Bickel et al. | Feb. 12, 1952 |
| 2,691,255 | Blazek | Oct. 12, 1954 |